US007314909B2

(12) United States Patent
Riding et al.

(10) Patent No.: US 7,314,909 B2
(45) Date of Patent: Jan. 1, 2008

(54) METHOD OF REDUCING THE STYRENE CONTENT OF A POLY(ARYLENE ETHER)/POLYSTYRENE BLEND, AND ARTICLES COMPRISING THE RESULTING THERMOPLASTIC RESIN

(75) Inventors: Geoffrey H. Riding, Castleton, NY (US); Katsuhisa Kumagai, Funabashi (JP); Kim G. Balfour, Delanson, NY (US); Robert Hossan, Delmar, NY (US)

(73) Assignee: General Electric Company, Schenectady, NY (US)

( * ) Notice: Subject to any disclaimer, the term of this patent is extended or adjusted under 35 U.S.C. 154(b) by 151 days.

(21) Appl. No.: 11/248,524

(22) Filed: Oct. 12, 2005

(65) Prior Publication Data

US 2007/0083035 A1    Apr. 12, 2007

(51) Int. Cl.
*C09F 6/00* (2006.01)
(52) U.S. Cl. ............... 528/500; 156/280; 156/283; 206/96; 206/139; 264/176.1; 264/219
(58) Field of Classification Search ............... 156/280, 156/283; 206/96, 139; 264/176.1, 219; 528/500
See application file for complete search history.

(56) References Cited

U.S. PATENT DOCUMENTS

| | | | |
|---|---|---|---|
| 3,383,435 A | 5/1968 | Cizek | |
| 3,633,880 A | 1/1972 | Newmark | |
| 4,312,776 A | 1/1982 | Puri et al. | |
| 4,369,126 A | 1/1983 | Bathgate | |
| 4,369,278 A | 1/1983 | Kasahara et al. | |
| 4,425,442 A | 1/1984 | Sato et al. | |
| 4,438,223 A | 3/1984 | Hunter | |
| 4,444,679 A | 4/1984 | Rowland et al. | |
| 4,554,294 A | 11/1985 | Hunter et al. | |
| 4,746,482 A | 5/1988 | Ribbing et al. | |
| 4,831,115 A | 5/1989 | Golba, Jr. et al. | |
| 4,906,700 A | 3/1990 | Banevicius | |
| 4,942,222 A | 7/1990 | White | |
| 4,992,222 A | 2/1991 | Banevicius et al. | |
| 4,994,217 A | 2/1991 | Banevicius et al. | |
| 5,017,656 A | 5/1991 | Bopp | |
| 5,089,091 A | 2/1992 | Fox et al. | |
| 5,102,591 A | 4/1992 | Hasson et al. | |
| 5,189,076 A | 2/1993 | Bopp | |
| 5,204,410 A | 4/1993 | Banevicius et al. | |
| 5,239,003 A * | 8/1993 | Onishi et al. ............ | 525/181 |
| 5,272,182 A | 12/1993 | Burnell | |
| 5,691,445 A | 11/1997 | Krupinski et al. | |
| 5,854,304 A | 12/1998 | Garcia et al. | |
| 6,037,410 A | 3/2000 | Adedeji et al. | |
| 6,274,670 B1 | 8/2001 | Adedeji et al. | |
| 6,306,953 B1 | 10/2001 | Fortuyn et al. | |
| 6,376,606 B1 | 4/2002 | Adedeji | |

| | | |
|---|---|---|
| 6,908,573 B2 | 6/2005 | Hossan |
| 2004/0152820 A1 | 8/2004 | Atkinson |
| 2004/0211657 A1 | 10/2004 | Ingelbrecht |

FOREIGN PATENT DOCUMENTS

| | | | |
|---|---|---|---|
| EP | 0346656 | * | 12/1989 |
| EP | 0 375 937 A2 | | 7/1990 |
| EP | 0447239 | * | 9/1991 |
| EP | 0 480 244 A2 | | 4/1992 |
| EP | 0480244 | * | 11/1992 |
| EP | 0 375 937 B1 | | 5/1996 |
| EP | 0 480 244 B1 | | 12/1999 |
| EP | 0480244 B1 | | 12/1999 |
| JP | 55110110 | * | 8/1980 |
| JP | 03-152155 | | 6/1991 |
| JP | 03152155 | * | 6/1991 |
| JP | 03153755 | * | 7/1991 |
| JP | 2005161789 | | 6/2005 |
| JP | 2005199891 A | | 7/2005 |
| JP | 2005240031 A | | 9/2005 |
| JP | 2005288833 A | | 10/2005 |
| WO | WO 9616123 | * | 5/1996 |
| WO | WO 02/43943 A1 | | 6/2002 |
| WO | WO 2005/073299 A1 | | 11/2005 |

OTHER PUBLICATIONS

International Search Report; International Application No. PCT/US2006/039443; International Filing Date Oct. 10, 2006; Date of Mailing Jan. 16, 2007 (6 pages).
JP 02-265959; Oct 30, 1990; Human Translation (8 pages).
JP 02-092956; Apr. 30, 1990; Human Translation (8 pages).
JP09-279013; Oct. 28, 1997; Human Translation (13 pages).
U.S. Appl. No. 10/815,881, filed Mar. 31, 2004, Alger et al.
U.S. Appl. No. 10/972,089, filed Oct. 22, 2004, Davis et al.
ASTM E1640-04 "Standard Test Method for Assignment of the Glass Transition Temperature By Dynamic Mechanical Analysis".
JP 02-092956; Publication Date: Apr. 3. 1990; (CAPLUS abstract only).
JP 02-265959; Publication Date: Oct. 30, 1990 (translation of abstract only).
Scholz, Dieter, et al., "Foaming Agents", Modern Plastics Encyclopedia, Mid-Oct. 1989 Issue, vol. 66, No. 11, pp. 184-188.
Barbooti, Mahmood M. et al., "Thermal Decomposition of Citric Acid", Thermochimico Acta. vol. 98 (1986) pp. 119-126.
Pascal, J.P., "Note on tests carried out by GE plastics on Aug. 2, 2005", original document in French (8 pgs), translation provided (10 pgs).
Popov, A., et al., "Paper Chromatographic Detection Of Some Acids Formed By the Thermal Decomposition Of Citric Acid", CAPLUS abstract only.

* cited by examiner

*Primary Examiner*—Terressa Boykin
(74) *Attorney, Agent, or Firm*—Cantor Colburn LLP (57) ABSTRACT

A poly(arylene ether)/polystyrene blend may be prepared by melt kneading a carboxylic acid compound, a poly(arylene ether), and a polystyrene to form an intimate blend, and steam stripping the intimate blend, where melt kneading is conducted with a specific energy consumption of about 0.1 to about 0.3 kilowatt-hour per kilogram of blend. The method allows the formation of an intimate resin blend while minimizing the styrene monomer content of the final blend.

42 Claims, 2 Drawing Sheets

METHOD OF REDUCING THE STYRENE CONTENT OF A POLY(ARYLENE ETHER)/POLYSTYRENE BLEND, AND ARTICLES COMPRISING THE RESULTING THERMOPLASTIC RESIN

BACKGROUND OF THE INVENTION

Thermoplastic blends of poly(arylene ether) resins and polystyrene resins are currently produced in large volumes and are highly valued for their balance of properties including stiffness, impact strength, tensile strength, and heat resistance. Some properties of the blend can be superior to those of either component resin alone. See, for example, U.S. Pat. No. 3,383,435 to Cizek, which illustrates blend flexural strength, flexural modulus, compressive strength, tensile strength, impact strength, and hardness values that are superior to corresponding values for the component resins.

Many possible product applications for thermoplastic resins require that the resin be free of any objectionable odors. Considerable effort has been expended to reduce odor components associated with poly(arylene ether) resins. Poly(arylene ether) resins are typically synthesized in the presence of odoriferous organic amines, and the poly(arylene ether) resin may incorporate and later liberate such amines. Thus, one effort to reduce the odor of poly(arylene ether) resins has focused on the removal of volatile components during extrusion. For example, U.S. Pat. No. 3,633,880 to Newmark describes an extruder that includes elements to alternately compress and decompress the resin, thereby liberating volatile components, and a plurality of vacuum vents to remove the volatile components. As another example, U.S. Pat. No. 4,746,482 to Ribbing et al. describes an extrusion process whereby a polyphenylene ether resin is melt kneaded under vacuum prior to mixing with another resin.

Another source of odor in poly(arylene ether) resins is impurities in the phenol monomer, which is oxidatively polymerized to produce the poly(arylene ether). Odoriferous impurities in the 2,6-dimethylphenol monomer, such as 2,4,6-trimethylanisole, may be substantially reduced using particular distillation procedures as described in U.S. Patent Application Publication No. US 2004-0211657 A1 to Ingelbrecht. Alternatively, the build-up of such impurities in the recycled solvent of a poly(arylene ether) process may be reduced by solvent purification methods described in U.S. Pat. No. 4,906,700 to Banevicius.

Yet another approach to reducing the odor of poly(arylene ether) resins and their blends with polystyrene has been to add materials to the extrusion process that reduce the odor of the extruded resin. For example, U.S. Pat. No. 5,017,656 to Bopp describes the addition of carboxylic acids and/or acid anhydrides during extrusion. In that reference, extruded pellets were subjectively graded for their odor, but no chemical analyses of specific odor components were reported. As another example, European Patent No. 480,244 B1 to Bopp et al. describes addition of carboxylic acids or anhydrides during extrusion, combined with "steam stripping" of the resin (i.e., addition of water to the extruder and venting of the resulting water vapor). That reference was particularly concerned with reducing the level of butanal impurity in the resin. As yet another example, U.S. Pat. No. 4,369,278 to Kasahara et al. describes extruding blends of polyphenylene ether and rubber reinforced polystyrene in an extruder with a vacuum vent, and optionally adding a pyrolysis inhibitor (e.g., a hindered phenol or a phosphite compound) and/or water to the extruder. The working examples of the Kasahara et al. patent indicate that the total content of volatiles in the resin blend may be reduced to levels as low as 2500 parts per million.

In order to serve aesthetically demanding markets such as panels for automobile interiors, there remains a need for methods of further reducing the level of volatiles in blends of poly(arylene ether) and polystyrene resins. In particular, there is a need for methods of compounding these resins that reduce the level of styrene in the resulting blend.

BRIEF DESCRIPTION OF THE INVENTION

The above-described and other drawbacks are alleviated by a method of reducing the styrene monomer content of a poly(arylene ether)/polystyrene blend, comprising: melt kneading a carboxylic acid compound, a poly(arylene ether), and a polystyrene to form an intimate blend; and steam stripping the intimate blend; wherein said melt kneading comprises blending with a specific energy consumption of about 0.1 to about 0.3 kilowatt-hour per kilogram of intimate blend.

Other embodiments, including a resin composition prepared by the method and articles comprising such a resin, are described in detail below.

BRIEF DESCRIPTION OF THE DRAWINGS

Referring now to the drawings wherein like elements are numbered alike in several FIGURES.

DETAILED DESCRIPTION OF THE INVENTION

One embodiment is a method of reducing the styrene monomer content of a poly(arylene ether)/polystyrene blend, comprising: melt kneading a carboxylic acid compound, a poly(arylene ether), and a polystyrene to form an intimate blend; and steam stripping the intimate blend; wherein said melt kneading comprises blending with a specific energy consumption of about 0.1 to about 0.3 kilowatt-hour per kilogram of intimate blend. The present inventors have conducted extensive research into methods of reducing the odor of poly(arylene ether)/polystyrene blend. In the process of this research, it was observed that some methods taught for the reduction of odor from the poly(arylene ether) component of the blend actually increased the amount of styrene and toluene in the final blend. It was therefore clear that combining known methods of odor reduction for poly(arylene ether)/polystyrene blend often did not have a predictable effect on the styrene content of the final blend. In particular, combining known methods of odor reduction often increased the levels of styrene in the blend. After extensive research involving many variations in extruder configuration and extrusion conditions, it was determined that styrene and toluene levels in the final blend could be substantially reduced if melt kneading of the carboxylic acid compound, the poly(arylene ether), and the polystyrene was conducted with a specific energy consumption of about 0.1 to about 0.3 kilowatt-hour per kilogram of intimate blend.

The method comprises melt kneading a carboxylic acid compound, a poly(arylene ether), and a polystyrene. The poly(arylene ether) may comprise repeating structural units having the formula wherein for each structural unit, each $Z^1$ is independently halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_1$-$C_{12}$ halohydrocarbyloxy wherein at least two carbon atoms separate the halogen and oxygen atoms; and each $Z^2$ is independently hydrogen, halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_1$-$C_{12}$ halohydrocarbyloxy wherein at least two carbon atoms separate the halogen and oxygen atoms. In one embodiment, each $Z^1$ is methyl and each $Z^2$ is hydrogen or methyl. In another embodiment, the poly(arylene ether) comprises a homopolymer of 2,6-dimethylphenol (i.e., poly(2,6-dimethyl-1,4-phenylene ether), a copolymer of 2,6-dimethylphenol and 2,3,6-trimethylphenol (i.e., poly(2,6-dimethyl-1,4-phenylene ether-co-2,3,6-trimethyl-1,4-phenylene ether), or a combination thereof.

The poly(arylene ether) may comprise molecules having aminoalkyl-containing end group(s), typically located in an ortho position to the hydroxy group. Also frequently present are tetramethyldiphenoquinone (TMDQ) end groups, typically obtained from reaction mixtures in which tetramethyldiphenoquinone by-product is present. The poly(arylene ether) may be in the form of a homopolymer; a copolymer; a graft copolymer; an ionomer; or a block copolymer; as well as combinations comprising at least one of the foregoing.

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milligram per milliliter of chloroform. The poly(arylene ether) has an initial intrinsic viscosity of 0.08 to 0.60 deciliters per gram (dl/g), as measured in chloroform at 25° C. Initial intrinsic viscosity is defined as the intrinsic viscosity of the poly(arylene ether) prior to compounding with the other components of the composition. The viscosity of the poly(arylene ether) may be up to 30% higher after compounding. A blend of poly(arylene ether) resins having different intrinsic viscosities may be used.

The polystyrene used in the method is a polymer generally comprising repeating units derived from styrene. In one embodiment, the polystyrene comprises at least 80 weight percent of repeating units derived from styrene. The styrene content of the polystyrene may be at least about 90 weight percent, at least about 95 weight percent, or at least about 98 weight percent. The styrene content may be 100 percent; i.e., the polystyrene may be a homopolystyrene. When the polystyrene comprises less than 100 weight percent of repeating units derived from styrene, it may be a random, block, or graft copolymer of styrene with at least one other copolymerizable monomer such as, for example, another alkenyl aromatic monomer (e.g., alpha-methylstyrene, para-methylstyrene, divinylbenzene), acrylonitrile, a conjugated diene (e.g., butadiene, isoprene), or maleic anhydride. In one embodiment, a conjugated diene is used as a copolymerizable monomer to form a block copolymer. In this embodiment, the portion of the polystyrene derived from the conjugated diene may, optionally, be partially or fully hydrogenated. Also, when a conjugated diene is used as a copolymerizable monomer, the polystyrene may comprise about 20 to about 90 weight percent of repeating units derived from styrene, and about 10 to about 80 weight percent of repeating units derived from the conjugated diene. The term "block copolymer will be understood to include diblock, triblock, tetrablock, and pentablock structures, as well as linear structures containing 6 or more blocks in total of polystyrene and poly(conjugated diene). The stereoregularity of the polystyrene may be atactic, syndiotactic, or isotactic. In one embodiment, the polystyrene is an amorphous polystyrene (i.e., it is not crystalline or semicrystalline). In one embodiment, the polystyrene comprises atactic homopolystyrene. In one embodiment, the polystyrene is selected from atactic homopolystyrenes, rubber-modified polystyrenes, block copolymers of styrene and a conjugated diene, hydrogenated block copolymers of styrene and a conjugated diene, and the like, and combinations thereof. A rubber-modified polystyrene is a blend and/or graft of a rubber modifier and a homopolystyrene. Preferred rubber-modified polystyrenes, also known as high-impact polystyrene or HIPS, may comprise about 88 to about 94 weight percent polystyrene and about 6 to about 12 weight percent polybutadiene, with an effective gel content of about 10% to about 35%. These rubber-modified polystyrenes are commercially available as, for example, GEH 1897 from General Electric Company, and BA 5350 from Chevron.

The poly(arylene ether) and the polystyrene may be melt blended in a weight ratio of about 1:99 to about 99:1. Within this range, the ratio may be at least about 5:95, at least about 10:90, or at least about 20:80. Also within this range, the ratio may be up to about 95:5, or up to about 90:10, or up to about 80:20.

The carboxylic acid compound used in the method is a carboxylic acid or a carboxylic acid anhydride. Generally, the carboxylic acid compound will be a $C_1$-$C_{20}$ carboxylic acid, a $C_2$-$C_{20}$ carboxylic acid anhydride, or a combination thereof. The carboxylic acid compound may comprise one, two, three, or more carboxylic acid groups (—C(O)OH) or carboxylic acid anhydride groups (—C(O)—O—C(O)—). Suitable carboxylic acid compounds include compounds having one acid or anhydride group such as, for example, formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, salicylic acid, p-hydroxybenzoic acid, anthranilic acid, m-aminobenzoic acid, p-aminobenzoic acid, o-methoxybenzoic acid, m-methoxybenzoic acid, p-methoxybenzoic acid, methyl butyric acid, dimethylvaleric acid, phenylbutyric acid, chloromethylbutyric acid, hydroxypropionic acid (lactic acid), dinitrobenzoic acid, methylbutanoic acid, phenylpropanoic acid, chlorophenylbutanoic acids, butenoic acids, and the like, hydrates of the foregoing acids, anhydrides of the foregoing acids, and combinations thereof. The term "anhydrides of the foregoing acids" as used herein includes by symmetrical and asymmetrical anhydrides. Suitable carboxylic acid compounds further include compounds having two or more carboxylic acid or anhydride groups such as, for example, malonic acid, succinic acid, glutaric acid, adipic acid, malic acid, maleic acid, fumaric acid, phthalic acid, isophthalic acid, terephthalic acid, bromoglutaric acid, dimethylglutaric acid, citraconic acid, citric acid, itaconic acid, and the like, hydrates of the foregoing acids, anhydrides of the foregoing acids, and combinations thereof.

In one embodiment, the carboxylic acid compound is selected from adipic acid, glutaric acid, malonic acid, succinic acid, phthalic acid, maleic acid, citraconic acid, itaconic acid, citric acid, and the like, hydrates of the foregoing acids, anhydrides of the foregoing acids, and combinations thereof. In one embodiment, the carboxylic acid compound comprises citric acid.

In one embodiment, the carboxylic acid compound is provided to the melt kneading step neat. For example, when the carboxylic acid compound is a solid at 25° C. and one atmosphere, it may be added as a solid to the blending apparatus (e.g., the extruder). In another embodiment, the carboxylic acid compound is provided to the melt kneading step as an aqueous solution. In this embodiment, the aqueous solution may be a liquid aqueous solution comprising about 5 to about 80 weight percent of the carboxylic acid compound. Within this range, the carboxylic acid compound amount may be at least about 20 weight percent.

The carboxylic acid compound is generally used in an amount of about 0.1 to about 10 parts by weight per 100 parts by weight total of the poly(arylene ether) and the polystyrene. Within this range, the carboxylic acid compound amount may be at least about 0.2 part by weight, or at least about 0.5 part by weight. Also within this range, the carboxylic acid compound amount may be up to about 5 parts by weight, or up to about 2 parts by weight.

Melt kneading the carboxylic acid compound, poly(arylene ether), and polystyrene may be conducted via any thermoplastic melt blending technique capable of producing an intimate blend. Apparatus suitable for preparing thermoplastic blends via melt kneading includes, for example, a two-roll mill, a Banbury mixer, and a single-screw or twin-screw extruder. In one embodiment, melt kneading comprises using a twin-screw extruder.

Figure 1:
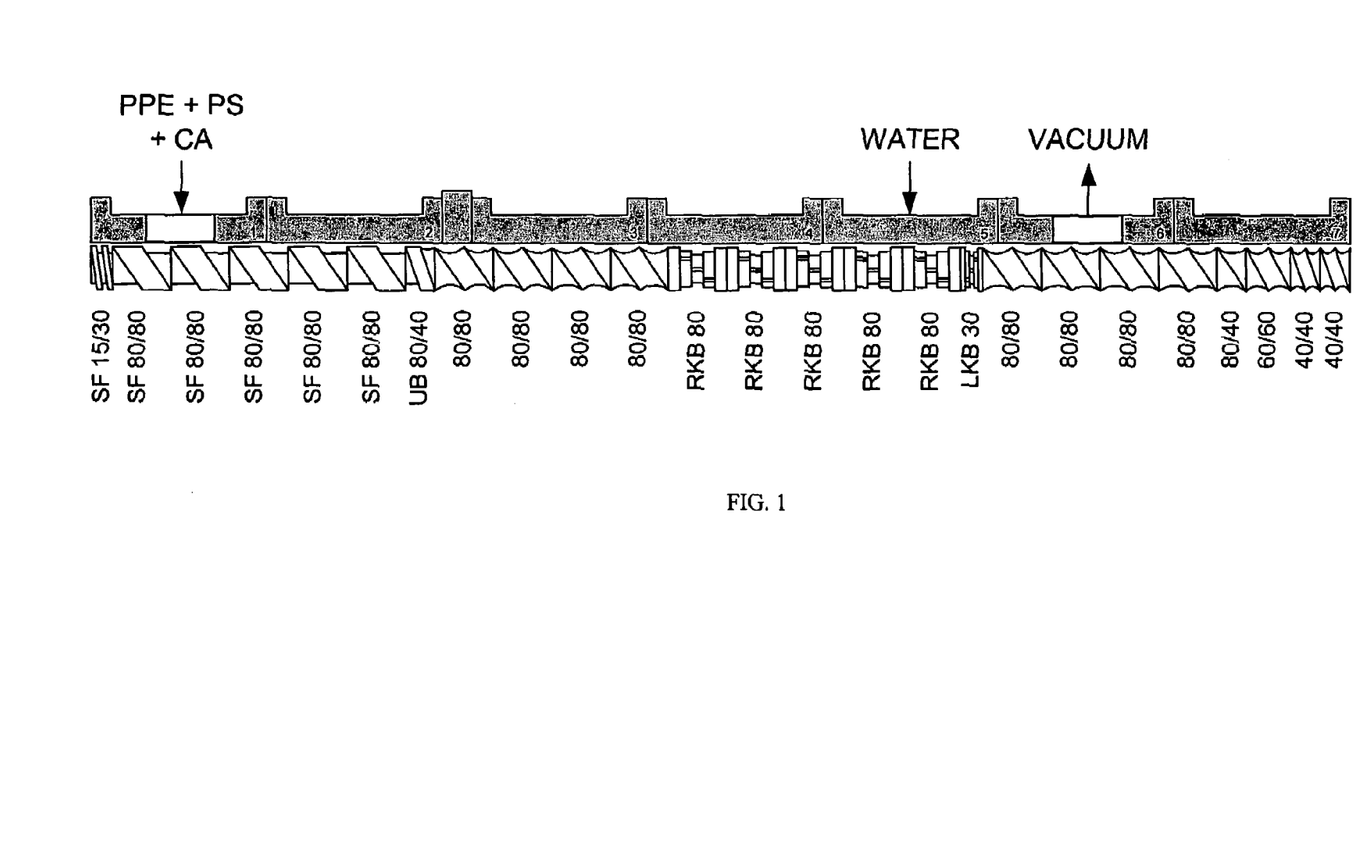
FIG. 1 is a diagrammatic view of an extruder configuration in which the poly(arylene ether) ("PPE"), polystyrene ("PS"), and carboxylic acid compound ("CA") are added at the extruder feed throat, and water for steam stripping is added in extruder barrel 5.

The method allows for various orders of addition of the carboxylic acid compound, poly(arylene ether), and polystyrene to the melt kneading apparatus. In one embodiment, the carboxylic acid compound, the poly(arylene ether), and the polystyrene are all added to the melt kneading apparatus in the same upstream location (e.g., at the feed throat). This embodiment is illustrated in FIG. 1, where poly(arylene ether) is abbreviated "PPE", polystyrene is abbreviated "PS", and carboxylic acid compound is abbreviated "CA". In another embodiment, illustrated in FIG. 2, the poly(arylene ether) is added upstream, and the polystyrene and carboxylic acid compound are added downstream. Other addition orders are possible, including, for example, upstream addition of polystyrene and downstream addition of poly(arylene ether) and carboxylic acid compound; upstream addition of polystyrene and poly(arylene ether), and downstream addition of carboxylic acid compound; upstream addition of carboxylic acid compound and downstream addition of poly(arylene ether) and polystyrene; upstream addition of polystyrene and carboxylic acid compound, and downstream addition of poly(arylene ether); upstream addition of poly(arylene ether), downstream addition of polystyrene, and further downstream addition of carboxylic acid compound; and upstream addition of polystyrene and carboxylic acid compound, and downstream addition of poly(arylene ether). It is also possible to split the addition of one or more components between different locations of the extruder.

Figure 2:
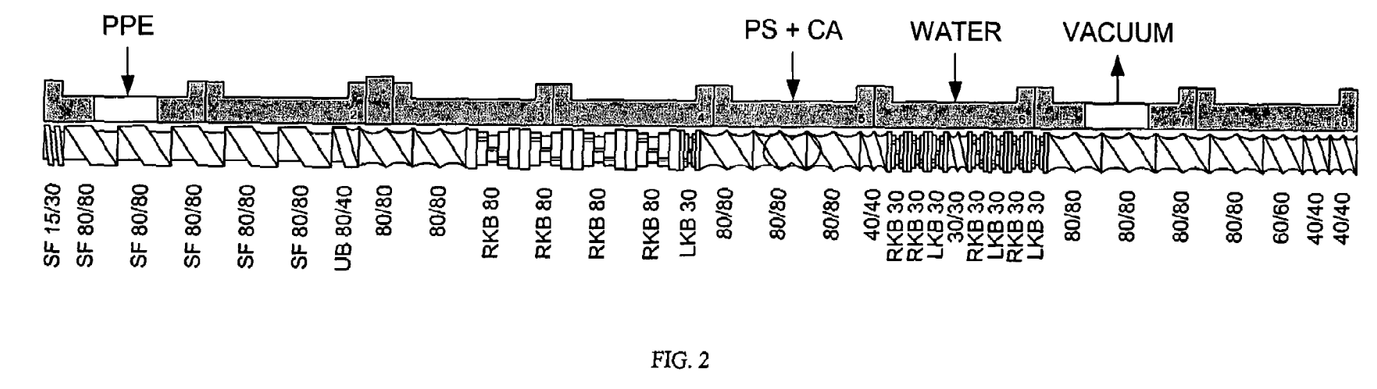
FIG. 2 is a diagrammatic view of an extruder configuration in which the poly(arylene ether) ("PPE") is added at the extruder feed throat, and the polystyrene ("PS") and carboxylic acid compound ("CA") are added downstream in extruder barrel 5, and water for steam stripping is added in barrel 6.

In the screw elements labels in FIGS. 1 and 2, "SF" stands for single flighted element, "UB" stands for a transition between single flighted and multiflighted elements, "RKB" stands for right-handed kneading block, and "LKB" stands for left-handed kneading block. Elements that have no letter label are conveying elements. Each labeled element includes a one-number or two-number designation following the three letter acronyms described above. For kneading elements (i.e., "RKB" and "LKB" elements), the sole number is the total length of the element in millimeters. For screw elements (i.e., "SF" and "UB" elements) and conveying elements, the first number is the pitch (i.e., the axial length in millimeters required for a flight to make a full revolution), and the second number is the total length of the screw element in millimeters. In both figures, the screw diameter is 58 millimeters. The numbered sections above the screw elements are known as barrel numbers.

The method comprises steam stripping the intimate blend formed from the carboxylic acid compound, the poly(arylene ether), and the polystyrene. Steam stripping of the thermoplastic resin comprises injecting water into the resin during melt kneading and vacuum venting the resulting water/resin mixture. Water injection may take place, for example, after the resin is melted but before a vacuum vent. In the embodiment depicted in FIG. 1, water injection may take place, for example, in the center of barrel 5. In the embodiment depicted in FIG. 2, water injection may take place, for example, in the center of barrel 6. The amount of water injected for steam stripping is generally about 0.1 to about 10 parts by weight of water into the intimate blend, based on 100 parts by weight total of the poly(arylene ether) and the polystyrene. Within this range, the injected water amount may be at least about 0.5 part by weight, or at least about 1 part by weight. Also within this range, the injected water amount may be up to about 5 parts by weight, or up to about 2 parts by weight.

As mentioned above, steam stripping comprises vacuum venting the resulting water/resin mixture. Vacuum venting preferably may occur downstream of melt kneading of the poly(arylene ether), the polystyrene, and the carboxylic acid compound, and downstream of water injection. For example, in FIG. 1, vacuum venting occurs in barrel 6, downstream of addition of poly(arylene ether), polystyrene, and carboxylic acid compound in barrel 1, downstream of the melt kneading blocks in barrels 4 and 5, and downstream of water injection in barrel 5. As another example, in FIG. 2, vacuum venting occurs in barrel 7, downstream of addition of poly(arylene ether) in barrel 1, downstream of the kneading blocks in barrels 3 and 4, downstream of addition of polystyrene and carboxylic acid compound in barrel 5, downstream of the melt kneading blocks in barrel 6, and downstream of water injection in barrel 6. Optionally, one or more vacuum vents may be used upstream of water addition.

The vacuum venting preferably removes most of the water added for steam stripping. The water may be removed by venting the composition to a vent with an absolute pressure of about 1 to about 80 kilopascals. Within this range, the vent pressure may be at least about 5 kilopascals, or at least about 15 kilopascals. Also within this range, the vent pressure may be up to about 70 kilopascals, or up to about 50 kilopascals. Depending on variables including the amount of water injected, the extruder barrel temperatures, and the vacuum vent pressure, the composition after extrusion may comprise a residual water concentration of about 0.01 to about 1 weight percent, based on the total weight of the composition. Within this range, the residual water concentration may be at least about 0.1 weight percent. Also within this range, the residual water concentration may be less than about 0.5 weight percent.

The method comprises melt kneading the carboxylic acid compound, poly(arylene ether), and polystyrene with a specific energy consumption of about 0.1 to about 0.3 kilowatt-hour per kilogram (kW-h/kg) of intimate blend. The term "specific energy consumption" is defined as the amount of energy required to process unit quantity of the resin through an extruder; that is, the energy consumed by the extruder per output of the extruder. Specific energy consumption may be determined by dividing the power consumed by the extruder drive motor by the total mass flow rate of the extruded product. Within the above range, the specific energy consumption may be up to about 0.2 kW-h/kg, or up to about 0.18 kW-h/kg, or up to 0.15 kW-h/kg. By using a specific energy consumption in the above range, it is possible to obtain an intimately blended resin composition yet minimize decomposition of the polystyrene and therefore minimize the concentration of styrene and other polystyrene decomposition products, including, for example, toluene, xylene, ethylbenzene, styrene dimer, and styrene trimer.

In one embodiment, the melt kneading occurs in an extruder, and the polystyrene has a residence time in the extruder of about 2 to about 60 seconds. Within this range, the polystyrene residence time may be up to about 30 seconds, or up to about 15 seconds, or up to about 10 seconds, or up to about 5 seconds. Polystyrene residence time may be reduced, for example, by increasing the screw rotation rate, by adding polystyrene via a downstream port, or minimizing the extruder length between polystyrene addition and the exit die. Polystyrene residence time may be determined, for example, by adding a single shot of tracer such as a pigment concentrate to the polystyrene inlet and then recording the concentration of the tracer in the extruder outlet as a function of the time after tracer addition. From this data, the mean residence time can be calculated using standard mathematical techniques.

In one embodiment, melt kneading comprises melt kneading with an extruder comprising a first mixing section and a second mixing section; and melt kneading comprises adding the poly(arylene ether) to the extruder upstream of the first mixing section, and adding the polystyrene and the carboxylic acid compound to the extruder downstream of the first mixing section and upstream of the second mixing section.

In one embodiment, melt kneading comprises melt kneading with an extruder, such that the ratio L/D is about 5 to about 45, where L is the distance between the polystyrene addition location and the blend discharge location, and D is the extruder screw diameter. Within this range, the ratio L/D may be at least about 10. Also within this range, the ratio L/D may be up to about 20. Using L/D ratios in the above range was found to be effective to allow intimate blending of the polystyrene component while minimizing the concentrations of styrene and toluene in the resin blend. The distance, L, between the polystyrene addition location and blend discharge location is measured between the centerline of the polystyrene inlet port and the end of the extruder die plate. The screw diameter is determined by the diameter of the tips of the screw element flights.

In one embodiment, the composition is melt blended with an extruder, and each extruder barrel downstream of polystyrene addition has a barrel temperature about 50 to about 120° C. above the glass transition temperature of the discharged intimate blend. Within this range, each barrel temperature may be at least about 80° C. above the glass transition temperature. Also within this range, each barrel temperature may be up to about 100° C. above the glass transition temperature. A temperature in the above range allows intimate blending yet minimizes formation of styrene and toluene. The glass transition temperature of the discharged intimate blend may be determined according to ASTM E1640, which is a standard test method for the assignment of glass transition temperature by dynamic mechanical analysis.

The method may, optionally, further comprise melt blending additional components with the carboxylic acid compound, the poly(arylene ether), and the polystyrene. The addition of such components should not interfere with the ability to achieve an intimate blend by melt blending with a specific energy consumption of about 0.1 to about 0.3 kilowatt-hour per kilogram of intimate blend. Suitable additional components may include, for example, plasticizers, impact modifiers, mold release agents, colorants (including pigments and dyes), thermal stabilizers, light stabilizers, antioxidants, drip retardants, antiblocking agents, antistatic agents, blowing agents, flame retardants, fillers, and the like, and combinations thereof.

The method may, optionally, further comprise pelletizing the steam-stripped intimate blend. The method may, optionally, further comprise sheet extruding the steam-stripped intimate blend.

The method is effective to minimize the styrene and toluene content of the intimate blend. For example, as demonstrated below, the steam-stripped intimate blend may have a styrene content that is about 30 to about 50% of that of a corresponding intimate blend that was melt blended without the carboxylic acid compound or steam stripping. The absolute styrene content of the intimate blend may be, for example, about 120 to about 270 parts per million by weight. Similarly, the steam-stripped intimate blend may have a toluene content that is about 20 to about 40% of that of a corresponding intimate blend that was melt blended without the carboxylic acid compound or steam stripping. The absolute toluene content of the intimate blend may be, for example, about 10 to about 25 parts per million by weight.

One embodiment is a method of reducing the styrene monomer content of a poly(arylene ether)/polystyrene blend, comprising: melt kneading a carboxylic acid compound, a poly(arylene ether), and a polystyrene to form an intimate blend; and steam stripping the intimate blend; wherein said melt kneading comprises blending with a specific energy consumption of about 0.1 to about 0.18 kilowatt-hour per kilogram of intimate blend; wherein the carboxylic acid compound is selected from adipic acid, glutaric acid, malonic acid, succinic acid, phthalic acid, maleic acid, citraconic acid, itaconic acid, citric acid, anhydrides of the foregoing acids, and combinations thereof; wherein the carboxylic acid compound is a solid at 25° C. and one atmosphere; wherein said melt kneading comprises blending in an extruder; and wherein said melt kneading comprises adding the carboxylic acid compound in solid form to the extruder.

One embodiment is a method of reducing the styrene monomer content of a poly(arylene ether)/polystyrene blend, comprising: melt kneading a carboxylic acid compound, a poly(arylene ether), and a polystyrene to form an intimate blend; and steam stripping the intimate blend; wherein said melt kneading comprises blending with a specific energy consumption of about 0.1 to about 0.15 kilowatt-hour per kilogram of intimate blend; wherein said melt kneading comprises blending in an extruder such that the polystyrene has a residence time in the extruder of about 2 to about 15 seconds; wherein said melt kneading comprises melt kneading with an extruder comprising a first mixing section and a second mixing section; wherein said melt kneading comprises adding the poly(arylene ether) to the extruder upstream of the first mixing section, and adding the polystyrene and the carboxylic acid compound to the extruder downstream of the first mixing section and upstream of the second mixing section; wherein the carboxylic acid compound comprises citric acid; wherein the carboxylic acid compound is used in an amount of about 0.2 to about 5 parts by weight per 100 parts by weight total of the poly(arylene ether) and the polystyrene; wherein the poly(arylene ether) is selected from a homopolymer of 2,6-dimethylphenol, a copolymer of 2,6-dimethylphenol and 2,3,6-trimethylphenol, and a combination thereof; wherein the poly(arylene ether) is present at about 5 to about 95 weight percent, based on the total weight of the poly(arylene ether) and the polystyrene; wherein the polystyrene is selected from atactic homopolystyrene, rubber-modified polystyrene, block copolymers of styrene and a conjugated diene, hydrogenated block copolymers of styrene and a conjugated diene, and combinations thereof, and combinations thereof; and wherein the polystyrene is present at about 5 to about 95 weight percent, based on the total weight of the poly(arylene ether) and the polystyrene.

One embodiment is a poly(arylene ether)/polystyrene blend prepared by any of the methods described above and having a styrene content about 170 to about 270 parts per million by weight. Another embodiment is an article comprising a poly(arylene ether)/polystyrene blend prepared by any of the methods described above. The article may, for example, comprise the blend in the form of a film, sheet, molded object, or composite comprising at least one layer comprising the poly(arylene ether)/polystyrene blend. Articles may be prepared from the blend using fabrication methods known in the art, including, for example, single layer and multilayer foam extrusion, single layer and multilayer sheet extrusion, injection molding, blow molding, extrusion, film extrusion, profile extrusion, pultrusion, compression molding, thermoforming, pressure forming, hydroforming, vacuum forming, and foam molding. Combinations of the foregoing article fabrication methods may be used. In one embodiment, a combination of sheet extrusion and foam extrusion may be used to fabricate a multilayer article in which a layer of foamed material is sandwiched between two layers of sheet material. In this embodiment, different compositions may be employed in the different layers. The poly(arylene ether)/polystyrene blend is particularly suitable for fabrication of articles for use in the interior spaces of buildings or vehicles. For example, the article may be a food and beverage container, an interior part for an automobile (including cars, trucks, sport utility vehicles, recreational vehicles, and the like), an interior part for an aircraft (including planes, helicopters, dirigibles, space vehicles, and the like), an interior part for a water-borne vehicle (including boats, submarines, and the like), and an interior part for a residential or commercial building. Automobile interior panels and methods for their fabrication are described, for example, in Japanese Patent Application Publication No. 2005-199891 A2 to Yamaguchi et al. Methods of fabricating food and beverage containers and low density foam sheet are known in the art.

The invention is further illustrated by the following non-limiting examples.

EXAMPLES 1-30

These examples show styrene and toluene levels as a function of thermoplastic resin composition, carboxylic acid concentration, and water concentration. Composition details given in the second through fifth columns of Table 1. All component amounts are expressed in parts by weight (pbw). In the Table 1 column headings, "PPE" refers to poly(2,6-dimethyl-1,4-phenylene ether) having an intrinsic viscosity of 0.46 deciliters per gram in chloroform at 25° C., obtained as PPO® 646 from General Electric Company. "PS" refers to an atactic homopolystyrene having a number average molecular weight of about 72,000 atomic mass units and a weight average molecular weight of about 214,000 atomic mass units, obtained as Novacor 2272 from Nova Chemical. "CA" refers to anhydrous citric acid obtained from Cargill. Water refers to water injected into the extruder for steam stripping.

Samples were compounded using a 30-millimeter diameter co-rotating, fully intermeshing, twin screw extruder. The total extruder length was 977 mm. The PPE, PS, and CA were all added in the first barrel which means the L/D for PS in the extruder was 31. The samples were extruded at 15.9 kilograms/hour (35 pounds/hour) at a screw speed of 300 rotations per minute (rpm). The feed components were plasticated in a mixing section located in the region between 7 and 12 diameters from the feed inlet. A vent was located immediately after this mixing section and operated at ambient pressure. Water was injected for some samples at a location that was 24.5 screw diameters from the feed inlet in a region of additional mixing. A vacuum vent was located 28 diameters from the feed inlet and was operated at about 15 kilopascals (kPa) absolute pressure. The barrel temperature was set to 220, 280, 290, and 310° C. for 100, 50, 30, and 0% PS, respectively.

Styrene and toluene levels in each sample were determined by dissolving 1.00 grams (+/−0.01 gram) of pellets or part in 25 milliliters of an internal standard solution consisting of 10 microliters of decane in 500 milliliters of chromatographic grade chloroform. This solution was then injected into a HP5989B mass spectrometer equipped with a HP5890 gas chromatograph, HP7673A auto injector, and DOS based Chemstation. The concentration of styrene and toluene was then compared against the known concentration of decane.

Styrene and toluene levels for each sample, reported in parts per million by weight (ppm), are given in the sixth and seventh columns of Table 1. The results show that the addition of citric acid and the use of steam stripping each substantially reduce the levels of styrene and toluene.

TABLE 1

| Ex. No. | PPE (pbw) | PS (pbw) | CA (pbw) | water (pbw) | toluene (ppm) | styrene (ppm) |
|---|---|---|---|---|---|---|
| 1 | 0 | 100 | 0 | 0 | 6 | 366 |
| 2 | 0 | 100 | 0 | 1 | 6 | 256 |
| 3 | 0 | 100 | 0.5 | 0 | 6 | 320 |
| 4 | 0 | 100 | 0.5 | 1 | 0 | 228 |
| 5 | 0 | 100 | 1 | 0 | 0 | 243 |
| 6 | 0 | 100 | 1 | 1 | 3 | 223 |
| 7 | 0 | 100 | 1.5 | 0 | 5 | 276 |
| 8 | 0 | 100 | 1.5 | 1 | 0 | 166 |
| 9 | 0 | 100 | 2 | 0 | 0 | 132 |
| 10 | 0 | 100 | 2 | 1 | 0 | 186 |
| 11 | 50 | 50 | 0 | 0 | 40 | 512 |
| 12 | 50 | 50 | 0 | 1 | 25 | 302 |
| 13 | 50 | 50 | 0.5 | 0 | 17 | 281 |
| 14 | 50 | 50 | 0.5 | 1 | 15 | 220 |
| 15 | 50 | 50 | 1 | 0 | 14 | 262 |
| 16 | 50 | 50 | 1 | 1 | 11 | 197 |
| 17 | 50 | 50 | 1.5 | 0 | 10 | 212 |
| 18 | 50 | 50 | 1.5 | 1 | 10 | 185 |
| 19 | 50 | 50 | 2 | 0 | 11 | 206 |
| 20 | 50 | 50 | 2 | 1 | 9 | 175 |
| 21 | 70 | 30 | 0 | 0 | 53 | 502 |
| 22 | 70 | 30 | 0 | 1 | 37 | 378 |
| 23 | 70 | 30 | 0.5 | 0 | 27 | 321 |
| 24 | 70 | 30 | 0.5 | 1 | 23 | 263 |
| 25 | 70 | 30 | 1 | 0 | 26 | 323 |
| 26 | 70 | 30 | 1 | 1 | 18 | 220 |
| 27 | 70 | 30 | 1.5 | 0 | 21 | 297 |
| 28 | 70 | 30 | 1.5 | 1 | 13 | 184 |
| 29 | 70 | 30 | 2 | 0 | 20 | 264 |
| 30 | 70 | 30 | 2 | 1 | 14 | 196 |

EXAMPLES 31-54

These examples show styrene and toluene levels as a function of thermoplastic resin composition, carboxylic acid concentration, method of carboxylic acid addition, water concentration, and reextrusion. In the Table 2 headings, "CA soln." refers to a 30 weight percent solution of citric acid in water. "CA solid" refers to addition of solid anhydrous citric acid (i.e., the same method used for citric acid addition in Examples 1-30). Five parts by weight of the 30% citric acid solution is equivalent to 1.5 parts by weight of anhydrous citric acid solid. "Reextr.?" refers to whether the sample was reextruded. A sample having a "Reextr.?" value of "no" was extruded once and pelletized before analysis. A sample having a "Reextr.?" value of "yes" was extruded and pelletized using the conditions specified in Table 2, then reextruded without using any carboxylic acid compound or steam stripping, and repelletized.

Styrene and toluene levels for each sample, reported in parts per million by weight (ppm), are given in the last two columns of Table 2. In addition to corroborating the results in Examples 1-30, the results show that addition of the carbboxylic acid compound as an aqueous solution is effective to reduce styrene and toluene levels, though somewhat less effective than addition of the carboxylic acid compound as a solid (compare, e.g., Examples 38 and 40). The results also show that toluene and styrene levels in the PPE/PS blends can increase on reextrusion (compare, e.g., Examples 35 and 47), presumably due to decomposition of the polystyrene at temperatures required for melt processing the poly(arylene ether)/polystyrene blend. However, the PPE/PS blends originally extruded with the carboxylic acid compound and water exhibit lower styrene and toluene levels than PPE/PS blends extruded without either or both of the carboxylic acid compound and water (compare, e.g., Examples 47, 50, and 54).

TABLE 2

| Ex. No. | PPE (pbw) | PS (pbw) | CA solid (pbw) | CA soln. (pbw) | water (pbw) | Reextr.? | styrene (ppm) | toluene (ppm) |
|---|---|---|---|---|---|---|---|---|
| 31 | 100 | 0 | 0 | 0 | 0 | no | 7 | 5 |
| 32 | 100 | 0 | 0 | 0 | 1 | no | <2 | <2 |
| 33 | 98.5 | 0 | 1.5 | 0 | 0 | no | <2 | <2 |
| 34 | 98.5 | 0 | 1.5 | 0 | 1 | no | <2 | <2 |
| 35 | 70 | 30 | 0 | 0 | 0 | no | 569 | 69 |
| 36 | 70 | 30 | 0 | 0 | 1 | no | 327 | 35 |
| 37 | 68.95 | 29.55 | 1.5 | 0 | 0 | no | 250 | 21 |
| 38 | 68.95 | 29.55 | 1.5 | 0 | 1 | no | 174 | 15 |
| 39 | 98.5 | 0 | 0 | 5 | 0 | no | <2 | <2 |
| 40 | 98.5 | 0 | 0 | 5 | 1 | no | <2 | <2 |
| 41 | 68.95 | 29.55 | 0 | 5 | 0 | no | 368 | 36 |
| 42 | 68.95 | 29.55 | 0 | 5 | 1 | no | 207 | 21 |
| 43 | 100 | 0 | 0 | 0 | 0 | yes | <2 | <2 |
| 44 | 100 | 0 | 0 | 0 | 1 | yes | <2 | <2 |
| 45 | 98.5 | 0 | 1.5 | 0 | 0 | yes | <2 | <2 |
| 46 | 98.5 | 0 | 1.5 | 0 | 1 | yes | <2 | <2 |
| 47 | 70 | 30 | 0 | 0 | 0 | yes | 665 | 79 |
| 48 | 70 | 30 | 0 | 0 | 1 | yes | 693 | 76 |
| 49 | 68.95 | 29.55 | 1.5 | 0 | 0 | yes | 462 | 45 |
| 50 | 68.95 | 29.55 | 1.5 | 0 | 1 | yes | 493 | 48 |
| 51 | 98.5 | 0 | 0 | 5 | 0 | yes | 7 | <2 |
| 52 | 98.5 | 0 | 0 | 5 | 1 | yes | <2 | <2 |
| 53 | 68.95 | 29.55 | 0 | 5 | 0 | yes | 590 | 62 |
| 54 | 68.95 | 29.55 | 0 | 5 | 1 | yes | 588 | 61 |

EXAMPLES 55-60

These examples represent six variations of blends with about 70 weight percent poly(arylene ether) and about 30 weight percent polystyrene. In the Table 3 column headings, "PPE" refers to poly(2,6-dimethyl-1,4-phenylene ether) having an intrinsic viscosity of 0.46 deciliters per gram in chloroform at 25° C., obtained as PPO® 646 from General Electric Company. "PS" refers to an atactic homopolystyrene having a number average molecular weight of about 72,000 atomic mass units and a weight average molecular weight of about 214,000 atomic mass units, obtained as Novacor 2272 from Nova Chemical. "CA" refers to anhydrous citric acid obtained from Cargill. Water refers to water injected into the extruder for steam stripping. The poly(arylene ether), polystyrene, and citric acid (which was added as a solid) were all added at the extruder feed throat. The results show that the combination of a carboxylic acid compound and steam stripping, represented by Examples 58 and 60, was effective to achieve styrene levels as low as 120 parts per million.

TABLE 1

| Ex. No. | PPE (pbw) | PS (pbw) | CA (pbw) | water (pbw) | toluene (ppm) | styrene (ppm) |
|---|---|---|---|---|---|---|
| 55 | 70 | 30 | 0 | 0 | 31 | 270 |
| 56 | 70 | 30 | 0 | 1 | 34 | 207 |
| 57 | 70 | 30 | 1.5 | 0 | 26 | 175 |
| 58 | 70 | 30 | 1.5 | 1 | 22 | 120 |
| 59 | 70 | 30 | 1.5 | 0 | 24 | 187 |
| 60 | 70 | 30 | 1.5 | 1 | 21 | 123 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

All ranges disclosed herein are inclusive of the endpoints, and the endpoints are combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of reducing the styrene monomer content of a poly(arylene ether)/polystyrene blend, comprising:
   melt kneading a carboxylic acid compound, a poly(arylene ether), and a polystyrene to form an intimate blend; and
   steam stripping the intimate blend;
   wherein said melt kneading comprises blending with a specific energy consumption of about 0.1 to about 0.3 kilowatt-hour per kilogram of intimate blend.

2. The method of claim 1, wherein the poly(arylene ether) comprises repeating structural units having the formula wherein for each structural unit, each $Z^1$ is independently halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_1$-$C_{12}$ halohydrocarbyloxy wherein at least two carbon atoms separate the halogen and oxygen atoms; and each $Z^2$ is independently hydrogen, halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_1$-$C_{12}$ halohydrocarbyloxy wherein at least two carbon atoms separate the halogen and oxygen atoms.

3. The method of claim 1, wherein the poly(arylene ether) comprises a homopolymer of 2,6-dimethylphenol, a copolymer of 2,6-dimethylphenol and 2,3,6-trimethylphenol, or a combination thereof.

4. The method of claim 1, wherein the polystyrene comprises at least 80 weight percent of repeating units derived from styrene.

5. The method of claim 1, wherein the polystyrene is selected from atactic homopolystyrenes, rubber-modified polystyrenes, block copolymers of styrene and a conjugated diene, hydrogenated block copolymers of styrene and a conjugated diene, and combinations thereof.

6. The method of claim 1, wherein the polystyrene comprises atactic homopolystyrene.

7. The method of claim 1, wherein the poly(arylene ether) and the polystyrene are melt blended in a weight ratio of about 1:99 to about 99:1.

8. The method of claim 1, wherein the poly(arylene ether) comprises a homopolymer of 2,6-dimethylphenol or a copolymer of 2,6-dimethylphenol and 2,3,6-trimethylphenol; and wherein the polystyrene is selected from atactic homopolystyrenes, rubber-modified polystyrenes, block copolymers of styrene and a conjugated diene, hydrogenated block copolymers of styrene and a conjugated diene, and combinations thereof.

9. The method of claim 1, wherein the carboxylic acid compound is selected from $C_1$-$C_{20}$ carboxylic acids and $C_2$-$C_{20}$ carboxylic acid anhydrides.

10. The method of claim 1, wherein the carboxylic acid compound is selected from formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, salicylic acid, p-hydroxybenzoic acid, anthranilic acid, m-aminobenzoic acid, p-aminobenzoic acid, o-methoxybenzoic acid, m-methoxybenzoic acid, p-methoxybenzoic acid, methyl butyric acid, dimethylvaleric acid, phenylbutyric acid, chloromethylbutyric acid, lactic acid, dinitrobenzoic acid, methylbutanoic acid, phenylpropanoic acid, chlorophenylbutanoic acids, butenoic acids, hydrates of the foregoing acids, anhydrides of the foregoing acids, and combinations thereof.

11. The method of claim 1, wherein the carboxylic acid compound is selected from malonic acid, succinic acid, glutaric acid, adipic acid, malic acid, maleic acid, fumaric acid, phthalic acid, isophthalic acid, terephthalic acid, bromoglutaric acid, dimethylglutaric acid, citraconic acid, itaconic acid, citric acid, hydrates of the foregoing acids, anhydrides of the foregoing acids, and combinations thereof.

12. The method of claim 1, wherein the carboxylic acid compound is selected from adipic acid, glutaric acid, malonic acid, succinic acid, phthalic acid, maleic acid, citraconic acid, itaconic acid, citric acid, hydrates of the foregoing acids, anhydrides of the foregoing acids, and combinations thereof.

13. The method of claim 1, wherein the carboxylic acid compound comprises citric acid.

14. The method of claim 1, wherein the carboxylic acid compound is a solid at 25° C. and one atmosphere; wherein said melt kneading comprises blending in an extruder; and wherein said melt kneading comprises adding the carboxylic acid compound in solid form to the extruder.

15. The method of claim 1, wherein said melt kneading comprises blending in an extruder; and wherein said melt kneading comprises adding the carboxylic acid compound to the extruder as an aqueous solution.

16. The method of claim 1, wherein the carboxylic acid compound is used in an amount of about 0.1 to about 10 parts by weight per 100 parts by weight total of the poly (arylene ether) and the polystyrene.

17. The method of claim 1, wherein said steam stripping the intimate blend comprises injecting about 0.1 to about 10 parts by weight of water into the intimate blend, based on 100 parts by weight total of the poly(arylene ether) and the polystyrene.

18. The method of claim 1, wherein said steam stripping the intimate blend comprises venting the intimate blend with a vent pressure of about 1 to about 80 kilopascals absolute pressure.

19. The method of claim 1, wherein the intimate blend after steam stripping has a residual water concentration of about 0.01 to about 1 weight percent, based on the total weight of the composition.

20. The method of claim 1, wherein said melt kneading comprises blending with a specific energy consumption less than or equal to 0.2 kilowatt-hour per kilogram of intimate blend.

21. The method of claim 1, wherein said melt kneading comprises blending with a specific energy consumption less than or equal to 0.15 kilowatt-hour per kilogram of intimate blend.

22. The method of claim 1, wherein said melt kneading comprises blending in an extruder such that the polystyrene has a residence time in the extruder of about 2 to about 60 seconds.

23. The method of claim 22, wherein the residence time is less than or equal to 15 seconds.

24. The method of claim 22, wherein the residence time is less than or equal to 5 seconds.

25. The method of claim 1, wherein said melt kneading comprises melt kneading with an extruder comprising a first mixing section and a second mixing section; and wherein said melt kneading comprises adding the poly(arylene ether) to the extruder upstream of the first mixing section, and adding the polystyrene and the carboxylic acid compound to the extruder downstream of the first mixing section and upstream of the second mixing section.

26. The method of claim 1, wherein said melt kneading comprises melt kneading with an extruder, and wherein the extruder comprises a screw diameter, a polystyrene addition location, and a blend discharge location; and wherein the ratio of the distance between the polystyrene addition location and the blend discharge location to the screw diameter is about 5 to about 45.

27. The method of claim 26, wherein the ratio of the distance between the polystyrene addition location and the blend discharge location to the screw diameter is about 10 to about 20.

28. The method of claim 1,
wherein said melt kneading comprises melt kneading with an extruder;
wherein the extruder comprises a polystyrene addition location, a blend discharge location, and a barrel having a barrel temperature;
wherein the intimate blend discharged from the discharge location has a glass transition temperature; and
wherein the barrel temperature downstream of the polystyrene addition location is about 50 to about 120° C. above the glass transition temperature of the discharged intimate blend.

29. The method of claim 1, further comprising pelletizing the steam-stripped intimate blend.

30. The method of claim 1, further comprising sheet extruding the steam-stripped intimate blend.

31. The method of claim 1, wherein the steam-stripped intimate blend has a styrene content that is about 30 to about 50% of that of a corresponding intimate blend melt blended without the carboxylic acid compound or steam stripping.

32. The method of claim 1, wherein the steam-stripped intimate blend has a styrene content about 120 to about 270 parts per million by weight.

33. The method of claim 1, wherein the steam-stripped intimate blend has a toluene content that is about 20 to about 40% of that of a corresponding intimate blend melt blended without the carboxylic acid compound or steam stripping.

34. The method of claim 1, wherein the steam-stripped intimate blend has a toluene content of about 10 to about 25 parts per million by weight.

35. A method of reducing the styrene monomer content of a poly(arylene ether)/polystyrene blend, comprising:
melt kneading a carboxylic acid compound, a poly (arylene ether), and a polystyrene to form an intimate blend; and
steam stripping the intimate blend;
wherein said melt kneading comprises blending with a specific energy consumption of about 0.1 to about 0.18 kilowatt-hour per kilogram of intimate blend; and
wherein the carboxylic acid compound is selected from adipic acid, glutaric acid, malonic acid, succinic acid, phthalic acid, maleic acid, citraconic acid, itaconic acid, citric acid, anhydrides of the foregoing acids, and combinations thereof;
wherein the carboxylic acid compound is a solid at 25° C. and one atmosphere;
wherein said melt kneading comprises blending in an extruder; and
wherein said melt kneading comprises adding the carboxylic acid compound in solid form to the extruder.

36. A method of reducing the styrene monomer content of a poly(arylene ether)/polystyrene blend, comprising:
melt kneading a carboxylic acid compound, a poly (arylene ether), and a polystyrene to form an intimate blend; and
steam stripping the intimate blend;
wherein said melt kneading comprises blending with a specific energy consumption of about 0.1 to about 0.15 kilowatt-hour per kilogram of intimate blend;
wherein said melt kneading comprises blending in an extruder such that the polystyrene has a residence time in the extruder of about 2 to about 15 seconds;
wherein said melt kneading comprises melt kneading with an extruder comprising a first mixing section and a second mixing section; and wherein said melt kneading comprises adding the poly(arylene ether) to the extruder upstream of the first mixing section, and adding the polystyrene and the carboxylic acid compound to the extruder downstream of the first mixing section and upstream of the second mixing section;
wherein the carboxylic acid compound comprises citric acid; and wherein the carboxylic acid compound is used in an amount of about 0.2 to about 5 parts by weight per 100 parts by weight total of the poly(arylene ether) and the polystyrene;
wherein the poly(arylene ether) is selected from a homopolymer of 2,6-dimethylphenol, a copolymer of 2,6-dimethylphenol and 2,3,6-trimethylphenol, and a combination thereof; and wherein the poly(arylene ether) is present at about 5 to about 95 weight percent, based on the total weight of the poly(arylene ether) and the polystyrene;

wherein the polystyrene is selected from atactic homopolystyrene, rubber-modified polystyrene, block copolymers of styrene and a conjugated diene, hydrogenated block copolymers of styrene and a conjugated diene, and combinations thereof, and combinations thereof; and wherein the polystyrene is present at about 5 to about 95 weight percent, based on the total weight of the poly(arylene ether) and the polystyrene.

37. A poly(arylene ether)/polystyrene blend prepared by the method of claim 1 and having a styrene content of about 120 to about 270 parts per million by weight.

38. A poly(arylene ether)/polystyrene blend prepared by the method of claim 36 and having a styrene content of about 120 to about 270 parts per million by weight.

39. An article comprising the poly(arylene ether)/polystyrene blend of claim 37.

40. The article of claim 39, comprising a film, sheet, molded object or composite comprising at least one layer comprising the poly(arylene ether)/polystyrene blend.

41. The article of claim 39, wherein the article is formed using at least one method selected from foam extrusion, single layer and multilayer sheet extrusion, injection molding, blow molding, extrusion, film extrusion, profile extrusion, pultrusion, compression molding, thermoforming, pressure forming, hydroforming, vacuum forming, and foam molding.

42. The article of claim 39, wherein the article is selected from food and beverage containers, automobile interior parts, aircraft interior parts, water-borne vehicle interior parts, and residential and commercial building interior parts.

* * * * *